Patented June 24, 1930

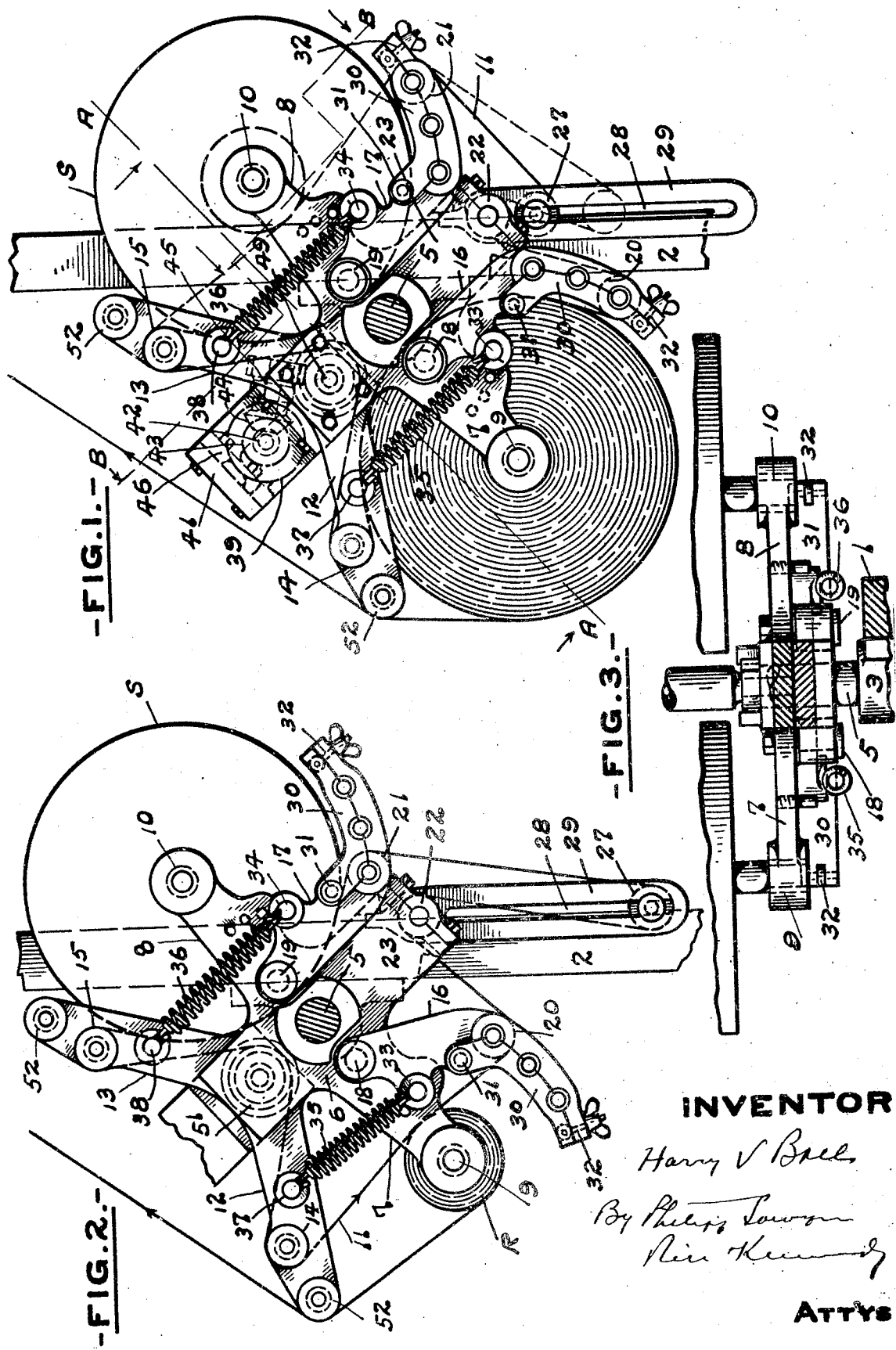

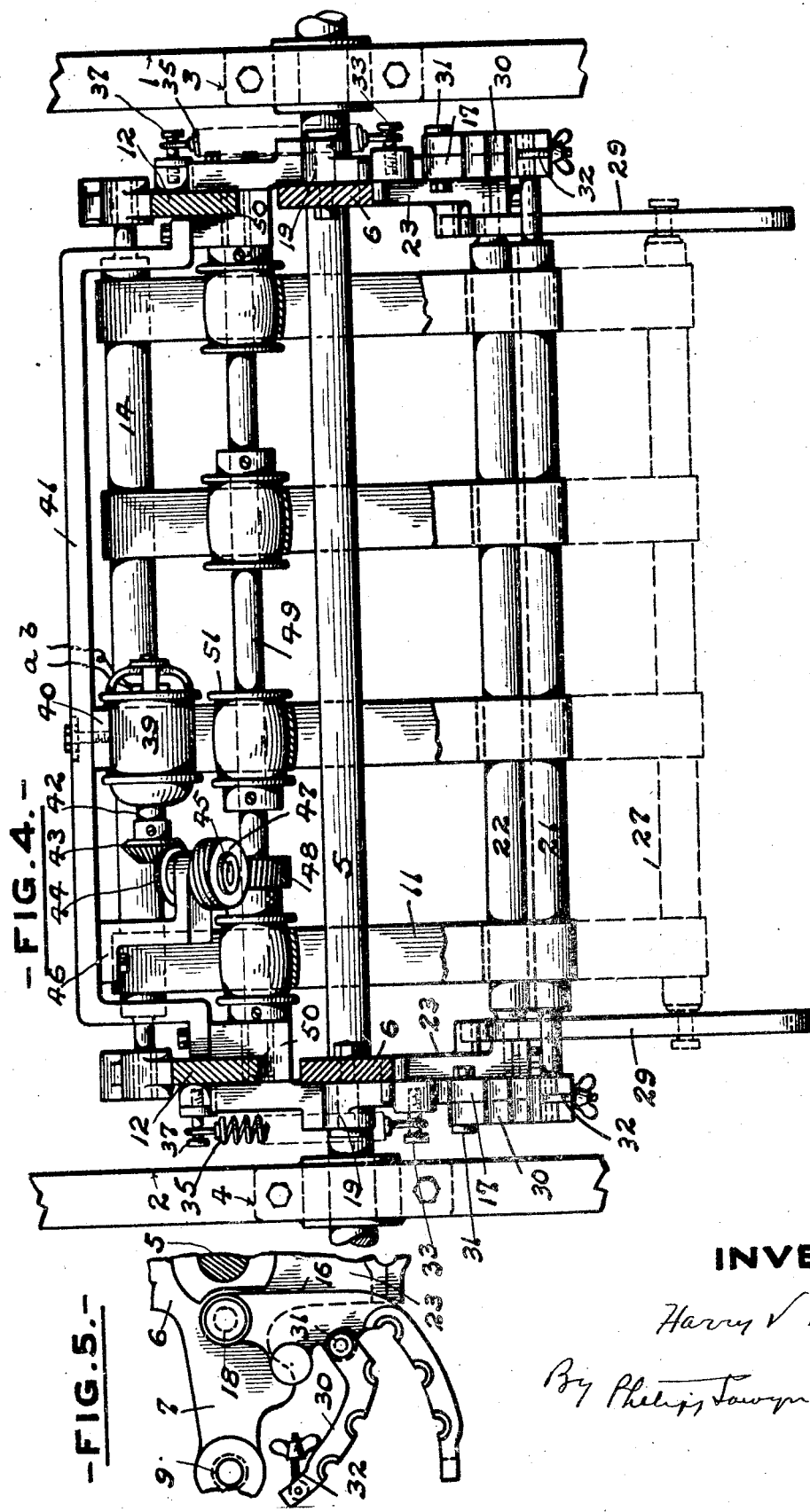

1,767,727

UNITED STATES PATENT OFFICE

HARRY V. BALL, OF CONCORD, MASSACHUSETTS, ASSIGNOR TO R. HOE & CO. INC., OF NEW YORK, N. Y., A CORPORATION OF NEW YORK

WEB-ROLL CHANGER

Application filed November 1, 1926. Serial No. 145,400.

This invention relates to certain improvements in controlling devices for controlling the unwinding of the web rolls used in web printing machines.

One object of the present invention is to provide an improved friction means, such as a belt or strap for engaging the surface of the unwinding roll for controlling the roll as it unwinds and the proper tensioning of the unwinding web, this friction means being so arranged that it will engage the surface of an unwinding roll and spare roll.

A further object of the invention is to provide means for driving or effecting a movement between this friction device and the surface of the roll which is independent of the press, so that the friction device may be independently driven and the tension or pressure exerted by the device varied independently of the press speed or the speed at which the web is unwinding from the roll.

A further object of the invention is to provide simple and convenient means for adjusting the pressure of the friction device on the roll surface and the wrap or contact area of the device on the roll surface so that this can be varied as desired for the required control of the roll while unwinding.

A further object of the invention is to produce a friction means of such character that it may act to remove lint or other surface dirt from the web surface while the web is unwinding.

With these and other objects not specifically referred to, the invention consists in certain novel parts, arrangements and combinations, which will be described in connection with the accompanying drawings and the novel features pointed out in the claims hereunto annexed.

In these drawings—

Figure 1 is a partly broken away end view of the improved web roll controlling mechanism, the parts being shown in one position of adjustment of the friction device;

Figure 2 is a similar view showing the position of the parts when the friction device has been adjusted to exert a different pressure from that shown in Fig. 1;

Figure 3 is a detail plan view, partly in section, taken on the line A—A of Fig. 1 and looking in the direction of the arrow;

Figure 4 is a side view, partly broken away and partly in section, the view being taken on the irregular line B—B of Fig. 1;

Figure 5 is a detail, broken, partly sectional view showing a bearing for supporting the friction device which may be used if desired.

Referring now to these drawings, the mechanism selected to illustrate the invention is that preferred and includes means for supporting an unwinding roll and a spare roll and a friction means which is common to the two rolls, although as to some of these features the invention is not to be restricted to such a construction.

In the mechanism shown, however, the operative parts of the roll controller are mounted in suitable side frames 1, 2 of any usual or desired configuration. These side frames support brackets 3, 4 in which are bearings for a shaft 5. Secured on this shaft at each end is a frame 6 which has extensions 7, 8 on opposite sides of the shaft in the extremities of which are bearings 9, 10 for supporting the spindles of a running or unwinding roll R and a spare roll S, it being understood that this construction is duplicated on each side of the machine.

This shaft may rock or rotate in any suitable manner, not shown, to move the roll supports from loading to running position or any intermediate position, as may be desired, so that the rolls may be given a bodily movement.

In accordance with the invention a friction device is employed for controlling the unwinding roll as it unwinds, and this friction device is such or so arranged that it will contact with and engage the surface of the unwinding roll and the spare roll. In the construction embodying the invention in its best form, means will be provided whereby this friction device may be driven independently of the press and in either direction so that this friction device may have a rate of movement different from that of the unwinding web and in a reverse direction, this construction having certain advantages hereinafter pointed out. While this friction device may assume various forms, in the particular construction illustrated, it is an endless belt or strap 11. This friction belt or strap may, if desired, extend the width of the roll, but in the preferred construction it is in the form of a plurality of narrow straps, as shown in Fig. 4, four such straps being illustrated. These friction belts or straps are, as before stated, endless and are supported so that the tension and contact area of the belts on the roll may be varied as desired, and these belts or straps are in the best construction, arranged so that they move with the rolls when the roll supports are rocked. While the particular construction for supporting and driving these belts or straps may be varied, as shown, the frames 6, before referred to, are provided on each side of the machine and above the shaft 5 with a pair of oppositely extending arms 12, 13 in which are supported rolls 14 and 15 over which the belts 11 pass. The frames 6 have also secured thereto to a pair of brackets 16, 17, these brackets being pivoted to the frame so as to have a swinging movement on studs 18, 19, this construction, of course, being duplicated on both sides of the machine. These brackets form supports for rolls 20, 21, hereinafter referred to, over which the belts pass. The belts also pass over a guide roll 22 suitably secured in extensions 23 of the frames 6, and they also pass over a compensating roll 27 mounted to have a vertical sliding movement in slots 28 in guide plates 29 secured to the lower end of the extensions 23 of the side frames 6.

The course of the belts is, therefore, over the roll 14, under the roll 20, over the roll 22, under the roll 27, and over the rolls 21 and 15. It will be observed that the run of the belts is between the running roll and the spare roll so that the belts are in surface engagement with both the rolls, and whichever roll is unwinding is under the control of the belts. It will, however, be observed that as the running roll decreases in size the belts automatically follow the roll, exerting the greatest tension and having the greatest contact area when the roll is large, this tension or pressure and contact area of the belts on the run surface decreasing as the roll decreases in size, the compensating roll 27 dropping in its guides as the roll decreases in size and rising as a new roll is fed into position against the belts.

In accordance with the invention means are provided for adjusting the pressure and the contact area of the belts on the roll surface, and in the preferred construction, this is effected by a bodily movement of the belts. While this may be effected in various ways, a convenient one is that shown, in which the rolls 21, 22 are mounted so that they may be supported at a plurality of points relatively to the rolls. As shown, the lower end of the brackets 16, 17 form split brackets and are provided with a plurality of supporting points for the roll spindles, three such points being shown. In the particular construction illustrated, the movable part of the bracket 30 is pivoted on a stud 31 secured in the bracket 16, the two parts of the bracket being clamped together in any suitable manner as by thumb screws 32.

The rolls are shown in two positions in Fig. 1 and Fig. 2, and it will be observed that as the rolls 20, 21 are moved from one to another of the supporting positions the wrap or contact area of the belts on the rolls is varied; thus a simple and effective way for adjusting the pressure and contact area of the belts on the rolls is provided.

To ensure a constant pressure of the belts against the rolls, spring means are provided for holding the belts in working position, and in the particular construction shown, the brackets 16, 17 are, as before stated, pivoted brackets and these brackets carry studs 33, 34 to which are secured one end of springs 35, 36, the other ends of these springs being secured to studs 37, 38 on the arms 12, 13, before referred to. With this construction, therefore, the belts are held against the roll surface under a constant tension.

In accordance with the invention, means are provided for driving these belts, and these means will be such that the belts may be driven independently of the speed of the press or the speed at which the web roll is unwinding. In the best constructions these driving means will be such that the driving movement of the belt may be either in the same direction as the rotation of the roll or in the reverse direction. Thus the reversing of the direction of the driving of the belts affects to some extent the removal of lint, dirt or the like from the web as it unwinds, and also will act to prevent over running of the web from the unwinding roll in the event of the sudden stoppage of the press. While the specific means employed for thus driving the belts may be somewhat varied, in the particular construction illustrated, there is provided a reversable motor 39 which is preferably mounted so as to move with the rolls when the rolls are rocked. This reversible motor may, through the circuit indicated at $a$, $b$ in Fig. 4, be connected with a suitable rheostat for driving the motor at the speeds desired, and with the emergency or stop switch of the press. The electrical connections for this are not shown, as these are readily understood. This motor is supported on a bracket 40 secured to a hanger 41 suitably supported from the side frames 6, before referred to, and the armature shaft 42 of the motor is provided with a mitre gear 43 which meshes with a mitre gear 44 on one end of a short shaft 45 supported in a bracket 46 secured to the hanger 41, before referred to. The other end of this shaft 45 carries a worm 47 which meshes with a worm 48 on a driving shaft 49 suitably supported in blocks 50 carried by the side frame 6, before referred to. This driving shaft 49 is provided with driving pulleys 51, one of these driving pulleys being provided for each of the belts or straps 11, the straps passing under and being driven by these driving pulleys. With this construction it will be observed that the belts may be driven in either direction and at any speed within the capacity of the motor desired, the driving of the belts being independent of the driving mechanism of the press, so that the belts may be driven at speeds varying from the unwinding speed of the rolls.

It will be understood that the web marked W will be fed to the press at the press speed, that is, the running roll will unwind at the press speed and the web will be guided to the press over guide rolls 52 suitably supported in the ends of the arms 12 and 13, before referred to, one of these guide rolls being provided for a running web in either position.

While the invention has been shown and described in its preferred form it will be understood that various changes and arrangements may be made in the specific structures shown and described, and that other embodiments of the invention may be made for effecting the objects of the invention within the scope of the claims hereunto appended.

What I claim is:

1. Web controlling mechanism for presses having in combination a support for a web roll while it is unwinding and a support for a spare roll, friction means engaging the surfaces of both rolls, and means independent of the press for driving the friction means at speeds varying from that of the unwinding web.

2. Web controlling mechanism for presses having in combination a support for a web roll while it is unwinding and a support for a spare roll, friction means engaging the surfaces of both rolls, means for adjusting the pressure and contact area of the friction means and the roll, and means for driving the friction means at speeds varying from that of the unwinding web.

3. Web controlling mechanism for presses having in combination a support for a web roll while it unwinding and a support for a spare roll, friction means engaging the surfaces of both rolls, means for adjusting the pressure and contact area of the friction means and the roll, and means for driving the friction means at speeds varying from that of the unwinding web and either in the direction of rotation of the roll or in the opposite direction.

4. Web controlling mechanism for presses having in combination a support for a web roll while it is unwinding and a spare roll, friction means engaging the surfaces of both rolls, means for holding the friction means in engagement with the roll surface under a constant tension, and means for driving the friction means at speeds varying from that of the unwinding roll.

5. Web controlling mechanism for presses having in combination a support for a web roll while it is unwinding and a spare roll, friction means engaging the surfaces of both rolls, means for holding the friction means in engagement with the roll surface under a constant tension, and means for driving the friction means at speeds varying from that of the unwinding roll and either in the direction of rotation of the roll or in the opposite direction.

6. Web controlling mechanism for presses having in combination a movable support for an unwinding roll and a spare roll, friction means engaging the surface of the running roll and movable with the support, and means independent of the press for driving the friction means at speeds varying from that of the unwinding roll.

7. Web controlling mechanism for presses having in combination a movable support for an unwinding roll and a spare roll, friction means engaging the surface of the running roll and movable with the support, and means independent of the press for driving the friction means at speeds varying from that of the unwinding roll and either in the direction of rotation of the roll or in the opposite direction.

8. Web controlling mechanism for presses having in combination a movable support for a web roll while it is unwinding and a spare roll, a friction means moving with the spare roll, a friction means moving with the support engaging the surface of the roll, and a reversible motor carried by the support for driving the friction means.

9. Web controlling mechanism for presses having in combination a support for a web roll while it is unwinding and a spare roll, a continuous belt, and means for guiding the belt so that it may be in engagement with both the roll surfaces.

10. Web controlling mechanism for presses having in combination a movable support for a web roll while it is unwinding and a spare roll, a continuous belt arranged to engage both roll surfaces, and means independent of the press for driving the belt at speeds varying from that of the unwinding web.

11. Web controlling mechanism for presses having in combination a movable support for a web roll while it is unwinding and a spare roll, a continuous belt arranged to engage both roll surfaces, and a reversible motor for driving the belts at speeds varying from that of the unwinding web.

In testimony whereof, I have hereunto set my hand.

HARRY V. BALL.